United States Patent [19]

Hibino

[11] Patent Number: 4,700,200

[45] Date of Patent: Oct. 13, 1987

[54] THERMAL PRINTER

[75] Inventor: Ikuo Hibino, Takizawa, Japan

[73] Assignee: Alps Electric Co., Ltd., Japan

[21] Appl. No.: 843,994

[22] Filed: Mar. 25, 1986

[30] Foreign Application Priority Data

Mar. 25, 1985 [JP] Japan .................................. 60-60331

[51] Int. Cl.[4] .......................... G01D 15/10; E41J 3/20

[52] U.S. Cl. ............................... 346/76 PH; 400/120; 400/696

[58] Field of Search ........................... 346/76 PH, 1.1; 400/120, 696

[56] References Cited

U.S. PATENT DOCUMENTS 3,855,448 12/1974 Hawagata et al. .................. 219/216

4,545,693 10/1985 Bartlett et al. ...................... 400/120

*Primary Examiner*—E. A. Goldberg

*Assistant Examiner*—Gerald E. Preston

*Attorney, Agent, or Firm*—Guy W. Shoup

[57] ABSTRACT

A thermal printer wherein a character or symbol printed on record paper by transfer can be corrected or erased by suitably controlling the printing energy applied to a thermal head, without the necessity of provision of a specific mechanism for correcting such printed characters or symbols. The printer comprises means for applying printing energy higher than printing energy for transfer recording to said thermal head to erase a character or symbol printed on the record paper.

2 Claims, 6 Drawing Figures

THERMAL PRINTER

BACKGROUND OF THE INVENTION

This invention relates to a thermal printer, and more particularly to a thermal printer having a character correcting function to erase characters or symbols recorded by thermal transfer printing.

Thermal printers have been developed wherein a thermal transfer medium having a thermally fusible material thereon is positioned between record paper and a thermal head, and a plurality of heat generating elements provided on the thermal head are heated to melt the thermally fusible material thereon in order to transfer it onto the record medium. Comparing with printers of other types, thermal printers of this type have an advantage that they do not make noises and can be produced at a low cost.

Recently, such thermal printers are being applied to electronic typewriters and the like. In such typewriters, a correcting function to erase recorded characters or symbols is essentially required. However, thermal printers normally have no effective correcting means for erasing characters or symbols which are once recorded by transfer onto record paper in order to correct them. Also developed these days are thermal printers of a different type wherein pigment of the same color with record paper is painted over characters or symbols recorded on the record paper to effect correction thereof, using an erasing ribbon provided independently of a thermal transfer medium in order to erase such characters or symbols. However, such correction requires an erase ribbon and a change-over mechanism for changing over between a thermal transfer medium and the erase ribbon, resulting in complication and increase of the size of the mechanism. Besides, there is a drawback that high quality recording is hindered by unevenness of a surface of pigment when rerecording on the pigment painted over the characters or symbols.

SUMMARY OF THE INVENTION

It is an object of the present invention to provide a thermal printer which allows, with its simple construction, effective erasing of characters, symbols and so on recorded by transfer.

According to the present invention, there is provided a thermal printer of the type wherein a thermally fusible material on a thermal transfer medium which is interposed between record paper and a thermal head is transferred onto the record paper by printing energy of the thermal head to effect recording, comprising correcting means for applying printing energy higher than the printing energy for transfer recording to the thermal head to erase a character or symbol printed on the record paper.

DETAILED DESCRIPTION OF THE PREFERRED EMBODIMENT

Figure 1:
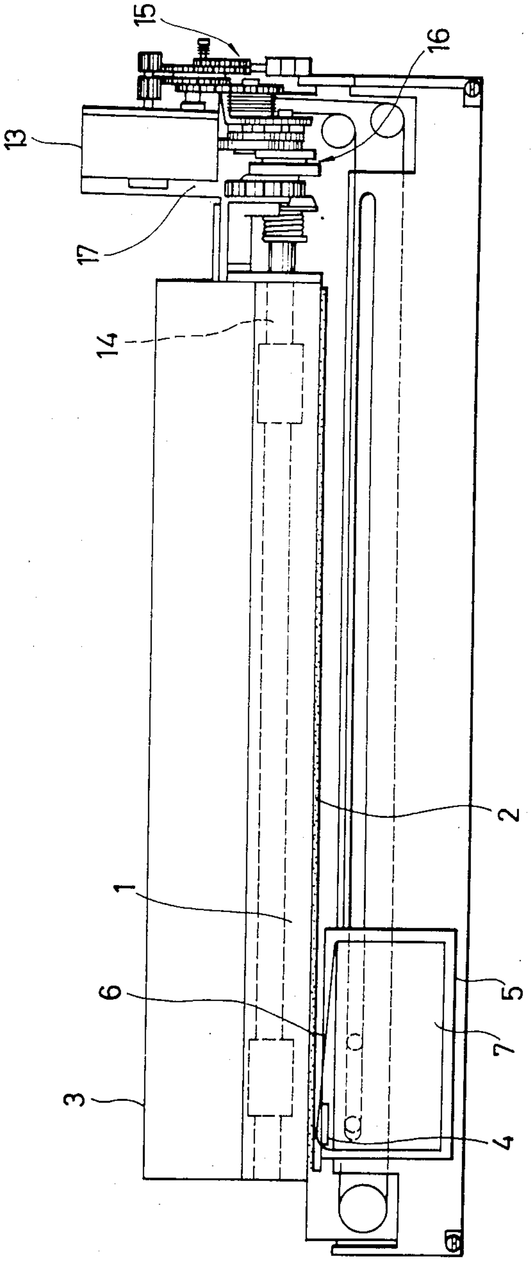
FIG. 1 is a plan view of a thermal printer according to the present invention.

An embodiment of the present invention will now be described with reference to the accompanying drawings. FIG. 1 shows a plan view of a thermal printer according to the present invention. Referring to FIG. 1, reference numeral 1 denotes a platen around which record paper not shown is wrapped, 2 a platen rubber member which is mounted at a front position or printing position of the platen 1, and 3 a paper guide for guiding the record paper wrapped around the platen 1. Reference numeral 4 designates a thermal head disposed in opposing relationship to the platen rubber member 2 and having a plurality of heat generating elements thereon, 5 a carriage on which the thermal head 4 is carried, 6 a printing tape serving as a thermal transfer medium having thereon a thermally fusible material which is to be transferred onto the record paper, and 7 a tape cassette in which the printing tape 6 is contained. The tape cassette 7 is removably mounted on the carriage 5. The printing tape 6 consists of a base film 10 formed, for example, from a polyester film, and a layer of thermally fusible material 11 to be transferred, and upon recording, the thermal head 4 is contacted with a rear face of the base film 10 while record paper 12 is closey contacted with a front face of the thermally fusible material 11.

Reference numeral 13 denotes a stepping motor serving as a driving source for moving the carriage 5 along the platen rubber member 2 and for rotating a paper feed shaft 14 to effect feeding of paper, 15 a gearing for transmitting a rotating force from the stepping motor 13, and 16 a clutch mechanism for selectively transmitting the rotational force of the stepping motor 13 either to move the carriage 5 or to feed the record paper. The stepping motor 13 is further connected to transmit its rotational force to a cam 17 to contact or remove the thermal head 4 with or from the record paper.

Figure 2:
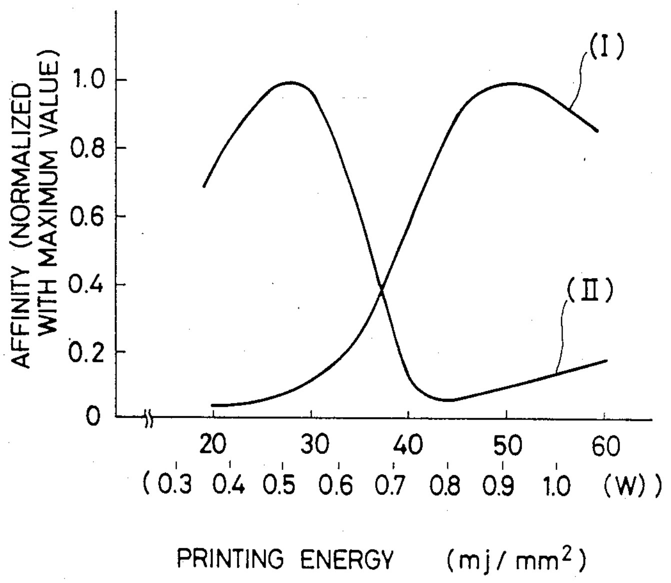
FIG. 2 is a graph illustrating a relationship between an affinity of a thermally fusible material and printing energy.

The thermally fusible material 11 of the printing tape 6 has a characteristic as shown by a graph in FIG. 2. Referring to FIG. 2, a curved line I shows how the affinity (representing an adhering force between two different substances) between the thermally fusible material 11 and the base film 10 varies relative to a change of the printing energy (heat energy) applied to the thermally fusible material 11 while another curved line II illustrates how the affinity between the thermally fusible material 11 and the record paper 12 varies relative to a change of the printing energy (heat energy) applied to the thermally fusible material 11. In particular, the affinity between the thermally fusible material 11 and the base film 10 presents its minimum value (a condition wherein the thermally fusible material may readily be exfoliated from the base material) at a printing energy of about 20 to 35 $mj/mm^2$ and its maximum value (the adhering force between the thermally fusible material and the base film is strong) at a printing energy of about 45 to 55 $mj/mm^2$. Meanwhile, the affinity between the thermally fusible material 11 and the record paper 12 presents it minimum value at about 20 to 35 $mj/mm^2$ and its maximum value at about 45 to 55 $mj/mm^2$. Accordingly, the thermally fusible material 11 presents different affinities with the base film 10 and with the record paper 12 which have a reversed relationship within a particular range of heat energy.

Figure 3:
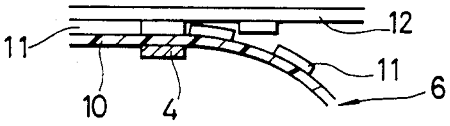
FIG. 3 is an illustrative view showing transfer of a fusible material for recording.

Now, a transfer recording operation using the printing tape 6 which has the thermally fusible material 11 thereon will be described with reference to FIG. 3. The thermal head 4 is contacted with the platen rubber member 2 via the printing tape 6 and the record paper 12 by an action of the cam 17. Then, by applying the heating energy of about 25 to 30 mj/mm$^2$ to the thermal head, the thermally fusible material 11 is melted to transfer a desired character, symbol or the like onto the record paper. In this instance, since the record paper 12 has a much higher affinity with the thermally fusible material 11 than the base film 10 as described above, recording of a high quality can be attained.

Figures 4A, 4B, 4C:
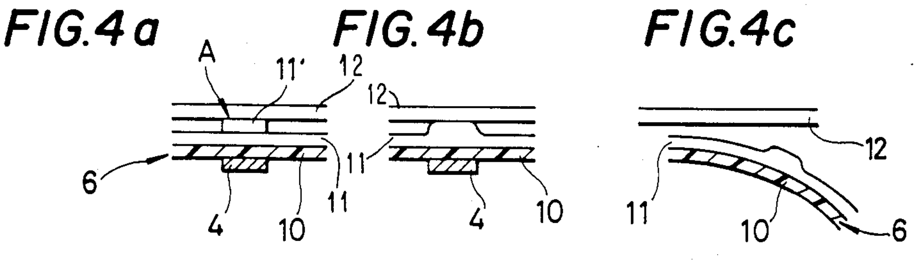
FIGS. 4(*a*), 4(*b*) and 4(*c*) are similar views showing different stages of correction of a recorded character or symbol.

Now, a correcting operation using the printing tape 6 will be described with reference to FIGS. 4(*a*), 4(*b*) and 4(*c*). When a character A printed on the record paper 12 is to be erased, at first the thermal head 4 is positioned in opposing relationship to the character A via the printing tape 6, and the printing energy of about 45 to 55 mj/mm$^2$ is applied to the thermal head (refer to FIG. 4(*a*)). As a result, the thermally fusible material 11 of the printing tape 6 and the thermally fusible material 11' of the printed character A are melted and integrated with each other (refer to FIG. 4(*b*)). Then, the printing tape 6 is removed from the record paper 12. At this instant, since the base film 10 has a much higher affinity with the thermally fusible material 11 than the record paper 12 as described above, the printed character A is removed integrally with the thermally fusible material 11 from the record paper (FIG. 4(*c*)). In this way, the character A to be corrected is erased, allowing correct printing by recording of the desired thermally fusible material by transfer again to the position of the record paper 12.

It is to be noted that while description has been given above of an embodiment of a thermal printer wherein a tape cassette containing a printing tape therein is mounted on a carriage so as to allow transfer recording as the carriage is moved, the present invention can naturally be applied also to a line thermal printer wherein a thermal head has heat generating elements for a print line thereon while a thermal transfer medium is used.

As apparent from the foregoing description, according to the present invention, a thermal printer of the type wherein a thermally fusible material on a thermal transfer medium which is interposed between record paper and a thermal head is transferred onto the record paper by printing energy of said thermal head to effect recording comprises correcting means for applying printing energy higher than the printing energy for transfer recording to said thermal head to erase a character or symbol printed on the record paper. Thus, the present invention presents a remarkable effect that transfer recording and correction can be attained by suitably controlling the printing energy to the thermal head, without the necessity of provision of a specific mechanism for correcting characters, symbols and so on recorded by transfer.

What is claimed is:

1. In a thermal printer of the type wherein a thermally fusible material on a thermal transfer medium which is interposed between a record paper and a thermal head is transferred onto the record paper by printing energy of said thermal head to effect recording thereon, correcting means for erasing transferred thermally fusible material from the record paper comprising;

said thermally fusible material being selected to have a higher affinity for said thermal transfer medium than said record paper at a higher printing energy and a lower affinity for said thermal transfer medium than said record paper at a lower printing energy, wherein said thermally fusible material is transferred onto said record paper at the lower printing energy; and means for applying the higher printing energy of said thermal head to said thermal transfer medium in order to cause said transferred thermally fusible material on said record paper to be transferred back to said thermal transfer medium when a character of symbol printed on said record paper is to be erased.

2. A thermal printer according to claim 1, wherein at said printing energy applied by said correcting means, the record paper has a much lower affinity with the thermally fusible material when melted than the thermal transfer medium as described above so that the printed character is removed from the record paper.

* * * * *